Oct. 9, 1934. C. E. K. MEES ET AL 1,976,355

SPEED CONTROL FOR BANDS

Filed Feb. 15, 1930 3 Sheets-Sheet 1

Inventors
Charles E. K. Mees &
Otto Sandvik.

By Newton W. Perrins
Attorney

Oct. 9, 1934.   C. E. K. MEES ET AL   1,976,355
SPEED CONTROL FOR BANDS
Filed Feb. 15, 1930   3 Sheets-Sheet 2

Inventors
Charles E. K. Mees &
Otto Sandvik.
By
Attorney

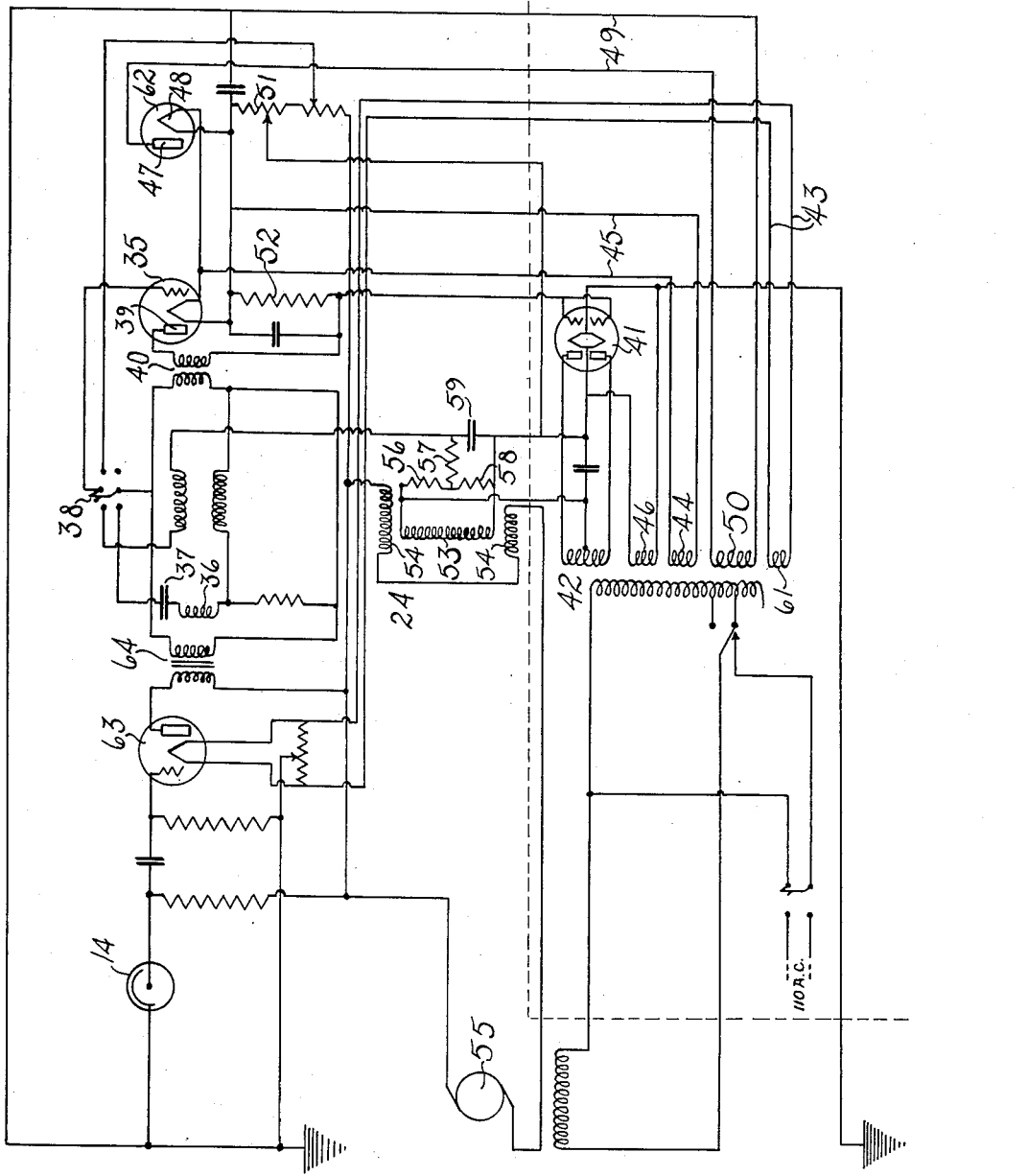

Patented Oct. 9, 1934

1,976,355

UNITED STATES PATENT OFFICE 1,976,355

SPEED CONTROL FOR BANDS

Charles E. K. Mees and Otto Sandvik, Rochester, N. Y., assignors to Eastman Kodak Company, Rochester, N. Y., a corporation of New York Application February 15, 1930, Serial No. 428,661

3 Claims. (Cl. 179—100.3)

This invention relates to the method and apparatus for controlling the linear speed of a photographic band or the rotational speed of a sound record in the form of a photographic sound disc, and to synchronize its motion with the motion of some other driving means without the use of a sprocket drive. For this purpose it is suggested that there be impressed on the photographic record a series of lines of constant frequency with the distribution of the density in each of these lines such that its transmission is either sinusoidal or any other desired function of the distance along the line of motion.

Figure 1:
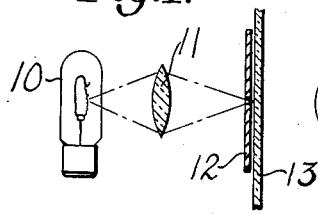
Figure 2:
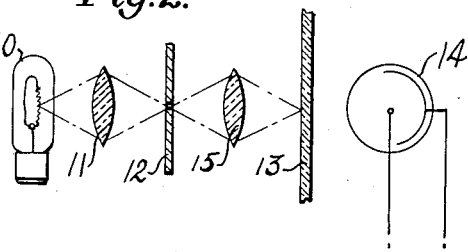
Figure 3:
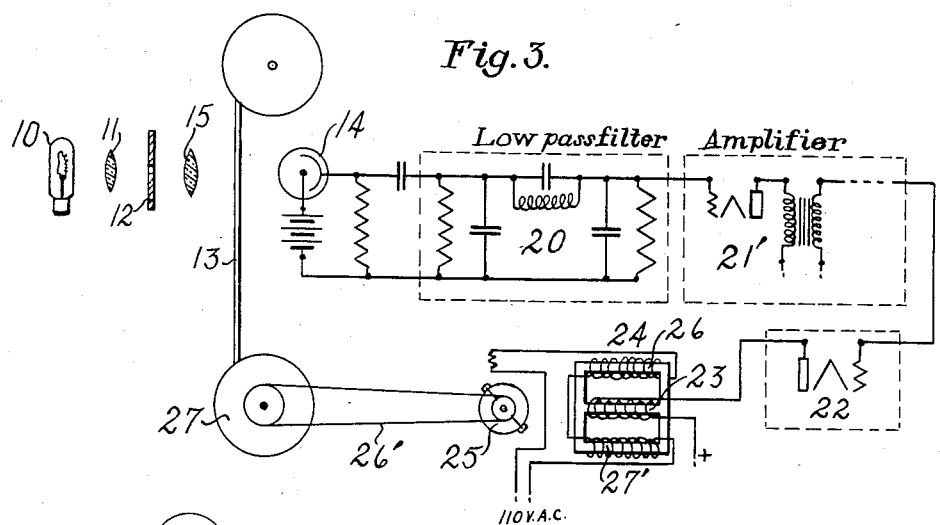
Figure 4:
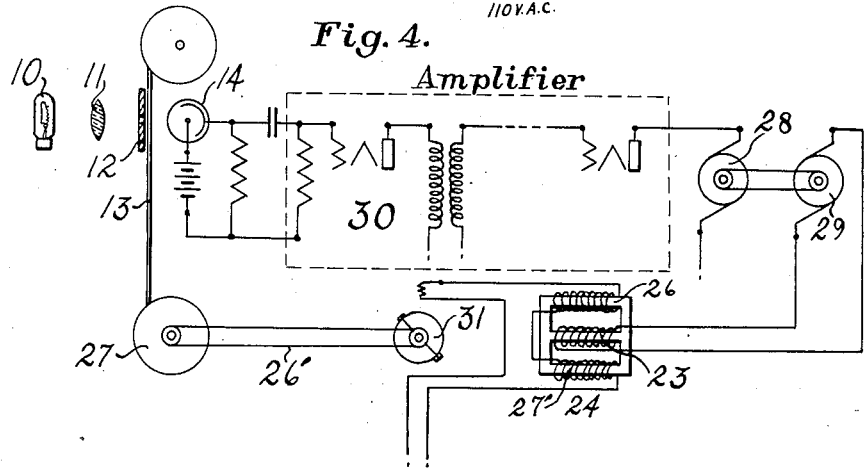
Figure 5:
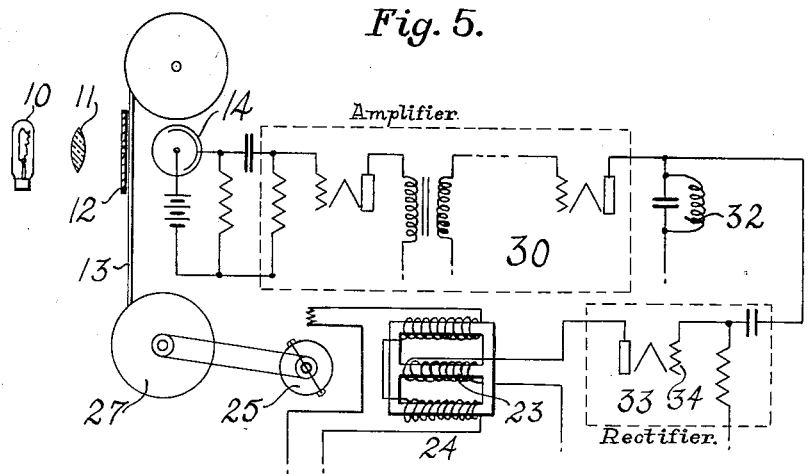
Figure 6:
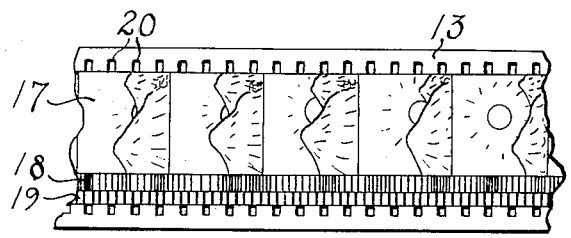
Figure 7:
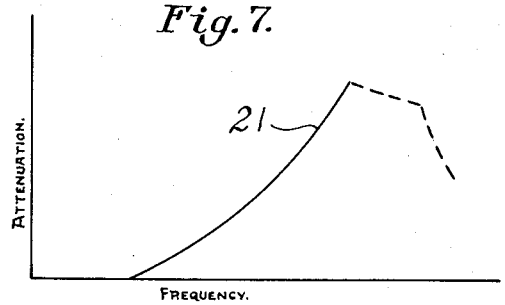

For a clearer understanding of the invention reference is made to the drawings in which Figs. 1 and 2 are diagrammatic showings of arrangements by which certain definite frequencies photographically recorded on a record may be translated into controlling photoelectric current; Figs. 3, 4 and 5 show various circuit arrangements for utilizing the controlling photoelectric current developed by the arrangements shown in Figs. 1 or 2, to control the speed of a film or other moving record; Fig. 6 is a view of a strip of film having thereon the well-known picture areas, the sound record area and an area or strip for controlling the speed of movement of the film; Fig. 7 is a chart showing the characteristics of a filter used in Fig. 3; while Fig. 8 is a complete circuit diagram of still another form of the invention.

Referring to Fig. 1 there is shown a light source 10, condenser lens 11, and a plate 12 having a slit therein, back of which film 13 passes in front of a photoelectric cell 14. Instead of causing the film to pass by a physical slit as shown in Fig. 1 it may be moved past an optical slit as shown in the arrangement of Fig. 2 wherein there is provided the light source 10, a condenser lens 11, a plate 12 having a slit therein, an objective lens 15, film 13 and the photoelectric cell 14. It will be understood that either of these arrangements can be used in any of the modifications to develop the controlling photoelectric current employed herein.

For purposes of controlling the film speed, the film 13 in addition to the usual picture areas 17 and the sound record area 18, is provided as shown in Fig. 7 with an additional area 19 paralleling the sound record, having a series of transverse lines spaced at a definite constant frequency. The distribution of the density in each of the lines in the area 19, which are printed on the film at the same time as the picture or sound record, may be such that its transmission is either sinusoidal or any other desired function of the distance along the line of motion. While the film band is shown provided with the usual perforations, such as 20, it will be understood that it is particularly adapted for roll drive as distinguished from sprocket drive where the perforations are essential. It will be recognized that when the film 13, as shown in Fig. 6 is moved past the optical system and the photoelectric cell of either Figs. 1 or 2, variations in the amount of light from the source 10 which falls on the photoelectric cell 14 causes a variation in the photoelectric current developed by this cell which current is proportional to the variation in the amount of light incident thereon. In accordance with the present invention this variable current is utilized to control the speed of a motor which operates the film driving means.

In the arrangement shown in Fig. 3 the photoelectric cell 14 is connected to a low pass filter, represented within the dotted rectangle 20, the characteristics of which indicated by the graph 21 in Fig. 7 are such that the impedance increases with the frequency so that the amount of current passed by it, depends on the frequency of the photoelectric current which in turn depends on the speed of the film 13. The current passed by the filter 20 may be amplified in any suitable amplifier, such as the electron discharge amplifier indicated within the dotted rectangle 21', having any desired number of stages to amplify the photoelectric current to the desired amount. The current thus amplified is then converted into uni-directional current by the detector or rectifier 22 preferably of the electron discharge type. This uni-directional current in the output circuit of the rectifier flows through the center winding 23 of a variable reactor generally designated 24 having the characteristic such that increased uni-directional current flowing through its winding 23 partially or completely saturates the core thereof, to decrease the alternating current impedance of the reactor thereby controlling the current flowing through the armature of the repulsion motor 25 in series with the reactor windings 26 and 27' to cause it to speed up. The motor 25 by means of a belt 26', drives the take-up reel 27 which advances the film 13 at the regulated speed. In this way by the proper design of the low pass filter 20 and by a suitable periodicity of lines on area 19 (Fig. 6) of the film, the desired film speed may be obtained.

In the modified arrangement shown in Fig. 4 the photoelectric current developed in the cell 14 by the passage of the film 13 past the slit in plate 12, is amplified by the electron discharge amplifier 30 included within the dotted line rectangle. While only two electron discharge devices are indicated it will be understood that any number of such devices may be utilized to give the desired amplification of the photoelectric current. The output of the amplifier 30 is connected to a synchronous motor 28 which in turn drives a differential, compound-wound direct-current generator 29 having such characteristics that when its speed increases the current developed thereby decreases. The output of the direct current generator 29 is connected in series with the winding 23 of a variable reactor 24 having characteristics similar to the reactor shown in Fig. 3 while windings 26 and 27' of this reactor are connected in series with the armature of the repulsion motor 31.

When the repulsion motor 31 is started, it drives the take-up reel 27 by means of belt 26' so that the film 13 passes the slit in the plate 12 at a speed which is somewhat below normal on account of the high impedance of the reactor 24. The movement of the film 13 past this slit causes the photoelectric cell 14 to develop photoelectric current which when amplified by the amplifier 30 is utilized to drive the motor 28 of the motor-generator unit 28—29. The direct current thus developed by the generator 29 varies the alternating current impedance in reactor 24 and thereby controls the speed of the repulsion motor 31. Since the direct current developed by the generator 29 decreases as the speed of the film increases, the desired film speed can be obtained by thus regulating the current output of the generator 29.

In the modification shown in Fig. 5, as in the previous forms of the invention, light from the source 10 passing through the condenser lens and the slit in the plate 12 is varied by the lines on the area 19 of the film so that variable light or other radiations fall on the photoelectric cell 14 to develop a varying photoelectric current. This photoelectric current is amplified by the electron discharge amplifier 30, in the output circuit of the last stage of which, there is provided a tuned circuit 32 which is tuned to a frequency corresponding to the film speed desired. This tuned circuit is connected to a detector or rectifier 33 preferably of the electron discharge type which may employ either grid rectification or plate rectification, although in the diagram of Fig. 5 grid rectification is represented. In this modification the impedance of the tuned circuit increases with the frequency of the current developed by the speed of the film and therefore the voltage impressed on the grid 34 of the rectifier. As the grid voltage of the rectifier 33 increases, the output current of the rectifier decreases and thereby causes a decrease in the direct current flowing through the winding 23 of the reactor 24 which increases the alternating current impedance of this reactor and therefore causes the repulsion motor 25 to reduce its speed. It will be understood that by a proper choice of circuit constants, the motor 25 can be controlled to drive the take-up reel 27 and the film 13 at any desired speed.

In the arrangement of Fig. 8, the photoelectric cell 14 may be used with either of the optical systems of Figs. 1 and 2 to develop variable photoelectric current which is then amplified by the thermionic tube amplifier 63. As shown, this amplifier includes only one amplifying stage but it will be understood that one or more stages may be used depending on the degree of amplification desired. The output circuit of the amplifier 63 includes the primary winding of a transformer 64 by which the amplifier is coupled to a detector 35 of the thermionic tube type. The input circuit of this detector which is connected between the grid and the filament of the detector tube 35 has a tuned network including inductance 36 and capacitance 37, connected in shunt of the secondary winding of the transformer 64. The output circuit of the detector connecting its anode and filament, includes the resistance 52 and a transformer winding 40 by which the input circuit and the mentioned output circuit are coupled together to effect regeneration. This output circuit is connected to the grid elements of a push-pull amplifier 41 of the thermionic tube type in such a manner that variation in current through resistance 52 causes a corresponding change in potential on these grids. The output circuits of the amplifier 41 includes the winding 53 and the network comprising resistances 56, 57 and 58 and condenser 59. While the elements of this amplifier are shown as combined in one tube, two three-element tubes connected in the same manner as the amplifier 41, may be used. The two-way switch 38 is provided to disable the photoelectric control when it is desired to dispense with automatic regulation of motor 55.

It will be understood that the filament current for the amplifier 63 is supplied from the 110 volt alternating current source through the secondary winding 61 of the power transformer generally designated 42 and thence over the conductors 43 while the filament current for the detector 35 and the rectifier 62 is similarly supplied through the secondary winding 44 of the power transformer and the conductors 45, and the filament current for the amplifier 41 is supplied through the secondary winding 46 of the power transformer 42. The rectifier 62 has its anode 47 and filament 48 connected in a circuit including conductors 49 and a secondary winding 50 of the power transformer so that this rectifier rectifies current from the alternating current source to supply negative C voltage along the potentiometer 51.

The photoelectric current which is developed by the cell 14, when amplified by the amplifier 63, causes the detector 35 to develop a resulting current flowing through the resistance 52. This causes the grids of the amplifier 41 to become more or less negative with a resulting reduction or increase in plate current through this amplifier and hence through the direct current winding 53 of the reactor 24 also provided with the windings 54. This reactor which may be similar in structure to the reactor 24 shown in Figs. 3, 4 and 5 functions in the same manner as these reactors previously described to control the armature current of the motor 55 which in turn drives the film 13 through the optical system. It will be understood that the tuned circuit including the inductance 36 and capacitance 37 is tuned to a critical frequency corresponding to the desired speed of the motor 55 so that when this motor exceeds the critical speed or drops below it, there is a sudden reversal of phase with a consequent change in the current through the detector 35 which causes the negative voltage on the grids of the amplifier 41 to change, thereby varying the plate current through the amplifier and the winding 53. To obtain uniform performance characteristics of the motor 55, a compensating network including the resistances 56, 57, 58 and condenser 59 are provided to feed back to the grid of the detector 35 a portion of the voltage drop across the direct current winding 55 thereby correcting for the static fluctuation in the control circuit. By a suitable adjustment of this compensating resistance, the control circuit may be arranged to give flat regulation, under-regulation or over-regulation as desired.

The condenser 59 in series with the high resistance 57 prevents "hunting" or surging of the motor speed by introducing a certain time lag so that when a change in current through the regulating reactance 53 occurs, the corresponding change in voltage drop is not transmitted to the condenser 59 immediately but this condenser changes its voltage after a certain time interval required to charge it through the resistance 57.

While the frequency recorded on the area 19 is not limited to any particular value it is convenient to use a frequency in the range of audibility such as is generated by a tuning fork.

The present disclosure is for purposes of illustration only and it will be understood that there may be many variations thereof within the scope of the appended claims without departing from the spirit of this invention.

What we claim is:

1. The method of moving a photographic strip at a uniform speed which comprises forming on said strip a record of substantially constant frequency, translating said record into an alternating current of a frequency corresponding to the speed of said moving photographic strip, selecting certain frequencies of alternating current therefrom, and using said selected alternating current to control the speed of movement of said strip.

2. In combination with a photographic strip having a record of substantially constant frequency formed thereon, a source of radiations, driving means including a motor for moving said strip past said source of radiations, a radiation responsive device in the path of varying radiations transmitted through said record from said source to develop a varying electrical current, a rectifier electrically connected to said device for translating said varying current into direct current, and a reactor provided with a plurality of windings, one of said windings being electrically connected to said rectifier and others of said windings being connected in circuit with said motor, said reactor having such characteristics that its alternating current impedance decreases with an increase of direct current supplied to said first mentioned winding.

3. In combination with a photographic strip having a record of substantially constant frequency formed thereon, a source of radiations, driving means including a motor for moving said strip past said source of radiations, a radiation responsive device in the path of varying radiations transmitted through said record from said source to develop a varying electrical current, a filter, a rectifier electrically connected to said device through said filter for translating selected frequencies of said varying current into direct current, and a reactor provided with a plurality of windings one of said windings being electrically connected to said rectifier and others of said windings being connected in circuit with said motor, said reactor having such characteristics that its alternating current impedance decreases with an increase of direct current supplied from said first winding.

CHARLES E. K. MEES.
OTTO SANDVIK.